(12) United States Patent
Ponsard

(10) Patent No.: US 10,819,545 B2
(45) Date of Patent: Oct. 27, 2020

(54) METHOD FOR CORRECTING AN ERROR IN THE FREQUENCY GENERATION BY A TERMINAL OF A WIRELESS COMMUNICATION SYSTEM

(71) Applicant: SIGFOX, Labege (FR)

(72) Inventor: Benoit Ponsard, Grenoble (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/087,640

(22) PCT Filed: Mar. 22, 2017

(86) PCT No.: PCT/FR2017/050668
§ 371 (c)(1),
(2) Date: Sep. 22, 2018

(87) PCT Pub. No.: WO2017/162983
PCT Pub. Date: Sep. 28, 2017

(65) Prior Publication Data
US 2019/0052497 A1    Feb. 14, 2019

(30) Foreign Application Priority Data

Mar. 22, 2016 (FR) .................................. 16 52457

(51) Int. Cl.
*H04L 27/26* (2006.01)
*H04B 7/208* (2006.01)
*H04B 7/212* (2006.01)
*H04W 56/00* (2009.01)

(52) U.S. Cl.
CPC ......... *H04L 27/2602* (2013.01); *H04B 7/208* (2013.01); *H04B 7/2125* (2013.01); *H04L 27/2657* (2013.01); *H04W 56/0035* (2013.01)

(58) Field of Classification Search
CPC ... H04B 7/208; H04B 7/2125; H04L 27/2602; H04L 27/2657; H04W 56/0035
See application file for complete search history.

(56) References Cited

U.S. PATENT DOCUMENTS

| | | | |
|---|---|---|---|
| 5,450,617 A | 9/1995 | Moore | |
| 5,659,545 A | 8/1997 | Sowles et al. | |
| 7,170,440 B1 * | 1/2007 | Beckner | G01S 7/024 342/118 |
| 7,471,720 B2 | 12/2008 | Ram et al. | |

(Continued)

*Primary Examiner* — Stephen J Clawson
(74) *Attorney, Agent, or Firm* — Im IP Law; Chai Im; C. Andrew Im

(57) ABSTRACT

A method for correcting an error in the generation of a frequency by a frequency synthesizer of a terminal of a terrestrial wireless communication system. A query message is transmitted by the terminal. Error in the generation of the frequency of the query message is estimated by an access network as a function of a theoretical transmission frequency of the query message by the terminal and an actual frequency of reception of the query message by the access network. A response message comprising an item of correction information is transmitted by the access network. A frequency of reception by the terminal of a broadcast signal transmitted by the access network is generated by the frequency synthesizer of the terminal and as a function of the item of correction information received by the access network.

8 Claims, 2 Drawing Sheets

(56) References Cited

U.S. PATENT DOCUMENTS

| | | | |
|---|---|---|---|
| 8,526,358 B2 * | 9/2013 | Booton | H04B 7/01 |
| | | | 370/321 |
| 10,027,455 B2 * | 7/2018 | Kim | H04L 5/0048 |
| 2006/0120487 A1 * | 6/2006 | Nakao | H04L 27/2659 |
| | | | 375/334 |
| 2008/0219191 A1 * | 9/2008 | Wang | H04B 1/70754 |
| | | | 370/280 |
| 2011/0170527 A1 * | 7/2011 | Yamamoto | H04W 56/0015 |
| | | | 370/338 |
| 2014/0003403 A1 * | 1/2014 | Li | H04B 7/015 |
| | | | 370/336 |

\* cited by examiner

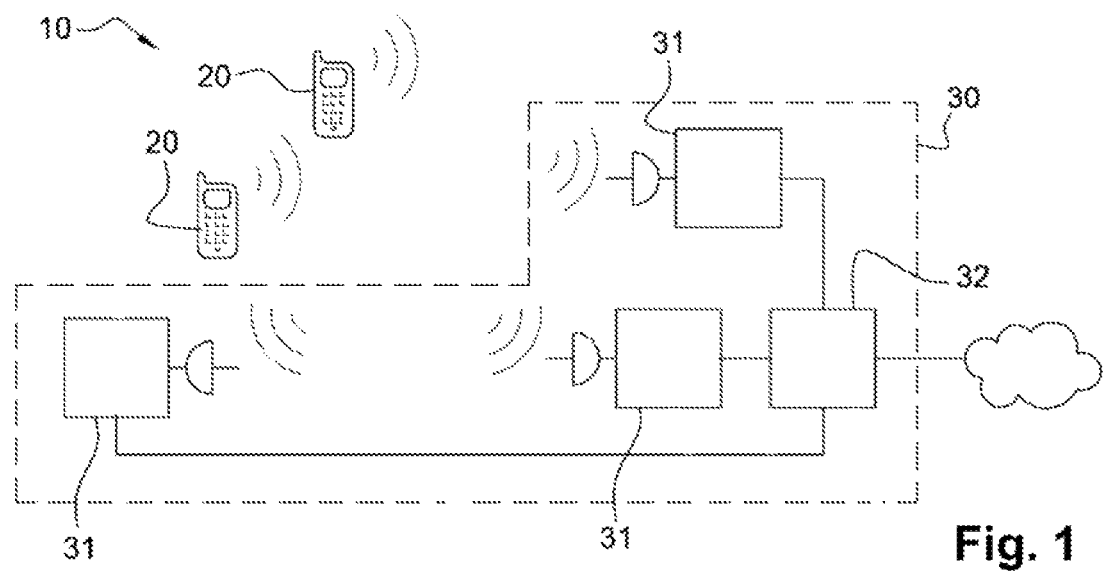
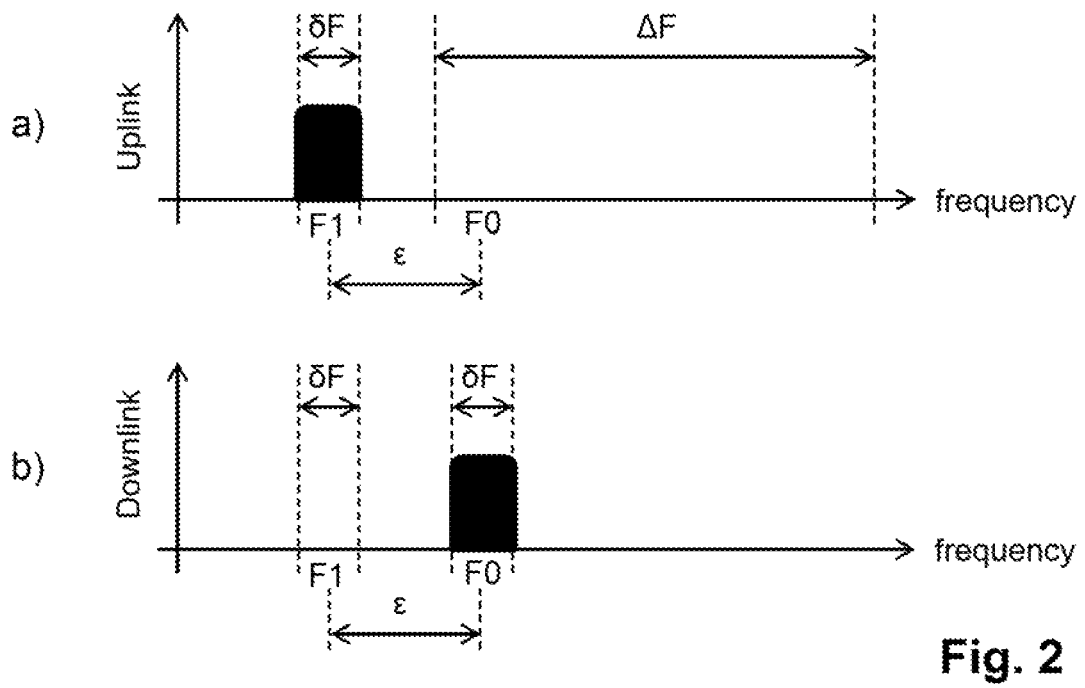
Fig. 1
Fig. 2

METHOD FOR CORRECTING AN ERROR IN THE FREQUENCY GENERATION BY A TERMINAL OF A WIRELESS COMMUNICATION SYSTEM

RELATED APPLICATIONS

This application is a § 371 application from PCT/FR2017/050668 filed Mar. 22, 2017, which claims priority from French Patent Application No. 16 52457 filed Mar. 22, 2016, each of which is incorporated herein by reference in its entirety.

TECHNICAL FIELD

This invention relates to the field of wireless communication systems, and relates more particularly to a method for correcting an error in the generation of a frequency by frequency synthesis means of a terminal of a terrestrial wireless communication system.

BACKGROUND OF THE INVENTION

This invention has a particularly advantageous application, although in no way limiting, in the terrestrial wireless communication systems with an ultra narrow band. The term "ultra narrow band" (UNB) means that the instantaneous frequency spectrum of the radio electric signals, exchanged between the terminal and an access network of said wireless communication system, is of frequency width less than two kilohertz, or even less than one kilohertz.

Such UNB wireless communication systems are particularly suited for applications of the "Machine-to-Machine" type (M2M) or the "Internet of Things" (IoT) type.

In the context for example of the IoT, each common everyday object can become a communicating object, and is for this purpose equipped with a terminal suitable for exchanging messages with the access network of the UNB wireless communication system.

In such a context, it is important to have solutions which are both of low cost (therefore low complexity) and at the same time of low electrical energy consumption. This makes it possible for example to make many common everyday objects communicating without affecting their cost of production significantly, and without excessively affecting their autonomy when they operate on a battery.

In order to reduce the cost and the complexity, it is in particular possible to equip a terminal with low-performance frequency synthesis means. This results however, in the case of a UNB wireless communication system, in that the error in the generation of frequency by said frequency synthesis means is likely to be larger than the frequency width of the instantaneous frequency spectrum of the radio electric signals exchanged between the terminal and the access network, or even much higher than the latter (at least a factor of five).

In a UNB wireless communication system, data exchanges are substantially one-way. Here, the terminals transmit messages intended for the access network, over an uplink from the terminals to said access network.

In the case of the use of a low-performance frequency synthesis means, the access network is then likely to receive, on the uplink, messages transmitted over arbitrary frequencies, due in particular to the errors introduced during frequency generation. However, it is then sufficient to provide the access network with a sufficient calculating capacity to make it possible to detect, on the uplink, a message transmitted over any frequency within a frequency band shared by all of the terminals, referred to as "multiplexing band".

However, as the multiplexing band is typically defined by regulatory constraints, it should be ensured that the messages transmitted on the uplink are effectively transmitted on a frequency within said multiplexing band, despite the use of low-performance frequency synthesis means. Indeed, if an uplink message has to be transmitted over a frequency, referred to as "theoretical frequency", that is within the multiplexing band but close to a limit of the latter, then it is entirely possible, due to the error that can be introduced by the frequency synthesis means, that the message is actually transmitted on a frequency that is outside said multiplexing band. Consequently, it is necessary to avoid theoretical frequencies that are too close to the limits of the multiplexing band, which results in sub-optimum use of said multiplexing band.

Such an operating mode of the UNB wireless communication system, wherein the data exchanges are substantially one-way, is entirely satisfactory for many applications, such as for example the remote reading of gas, water and electricity meters, remote surveillance of buildings or homes, etc.

In certain applications however, it can be advantageous to also be able to carry out data exchanges in the other direction, namely over a downlink from the access network to the terminals. In particular, it can be advantageous to transmit distribution signals, either global distribution signals (broadcast signals) or group distribution signals (multicast signals), comprising data that may be of interest to all or some of the terminals.

However, in order to limit the cost of manufacturing terminals, the detecting of broadcast signals has to be carried out simply and economically from an electrical energy consumption standpoint.

However, the use of low-performance frequency synthesis means makes detecting broadcast signals more difficult.

Indeed, taking for example a broadcast signal transmitted over a predetermined frequency, known a priori by the terminal, then the error introduced during the generation of this frequency by the frequency synthesis means of said terminal, which can be much higher than the frequency width of the instantaneous frequency spectrum of the broadcast signal, can result in the non-detection of said broadcast signal.

It is then necessary, in order to be able to detect a broadcast signal issued over a predetermined frequency, to search for said broadcast signal within a frequency band, comprising said predetermined frequency, with a frequency width much greater than that of the instantaneous frequency spectrum of said broadcast signal. However, this results in an increase in the complexity of the terminal, as well as an increase in the consumption of electrical energy of said terminal, which makes this solution not very suitable for applications of the M2M or IoT type.

OBJECT AND SUMMARY OF THE INVENTION

This invention has for objective to overcome all or some of the limitations of the solutions of prior art, in particular those mentioned hereinabove, by proposing a solution that makes it possible to correct the error in the generation of a frequency by frequency synthesis means while still limiting the impact on the complexity and the cost of manufacturing the terminals.

To this effect, and according to a first aspect, the invention relates to a method for correcting an error in the generation of a frequency by frequency synthesis means of a terminal of a terrestrial wireless communication system, said terrestrial wireless communication system comprising an access network suitable for exchanging data with said terminal. The method for correcting further comprises:

- transmitting, by the terminal and intended for the access network, of a query message on a frequency generated by the frequency synthesis means,
- estimating, by the access network, of the error in the generation of the frequency of the query message as a function of a theoretical transmission frequency of the query message by the terminal and an actual frequency of reception of said query message by the access network,
- transmitting, by the access network and intended for said terminal, of a response message comprising an item of correction information of said estimated error,
- generating a frequency by the frequency synthesis means of the terminal, as a function of the item of correction information received from the access network.

As such, in order to correct the error in the generation of the frequency, the terminal transmits to the access network a query message which is used by said access network to estimate the error introduced during the generation of frequency by the frequency synthesis means of said terminal. Once the error is estimated, the access network sends an item of correction information to the terminal, from which the terminal can correct the error in the generation of the frequency by the frequency synthesis means.

In other terms, the correction of the error in the generation of the frequency by the frequency synthesis means of the terminal is distributed between the access network and said terminal:

- the access network estimates, from the query message received from the terminal, the error to be corrected in the generation of the frequency,
- the terminal applies the correction that makes it possible to compensate the error estimated by said access network.

Consequently, the additional complexity required on the terminal, in order to correct the error in the generation of the frequency, is highly reduced since the estimation of said error, which corresponds to the task that requires the highest calculating capacity, is carried out by the access network. The impact on the complexity and the cost of manufacturing the terminal is therefore highly reduced.

In particular embodiments, the method for correcting the error in the generation of the frequency can further comprise one or several of the following characteristics, taken individually or according to all technically possible combinations.

In particular embodiments, the query message comprises an item of information allowing the access network to determine the theoretical frequency over which said query message has been theoretically transmitted by the terminal.

In particular embodiments, the theoretical frequency over which said query message has been theoretically transmitted by the terminal is a predetermined frequency known a priori by the access network.

In particular embodiments, the item of correction information received from the access network is used by the terminal to generate a frequency of reception by the terminal of a broadcast signal transmitted by the access network.

In particular embodiments, the item of correction information received from the access network is used by the terminal to generate a transmission frequency by the terminal of a message intended for the access network.

In particular embodiments, the item of correction information contains the error estimated by the access network.

In particular embodiments, the item of correction information comprises a corrected value of a frequency of reception by the terminal of a broadcast signal transmitted by the access network.

According to a second aspect, the invention relates to a terrestrial wireless communication system comprising an access network and at least one terminal, said terminal comprising frequency synthesis means likely to introduce an error in the generation of a frequency, wherein:

- the terminal comprises means configured to transmit, intended for the access network, a query message on a frequency generated by the frequency synthesis means,
- the access network comprises means configured to estimate the error in the generation of the frequency of the query message as a function of a theoretical transmission frequency of the query message by the terminal and an actual frequency of reception of said query message by the access network,
- the access network comprises means configured to transmit, intended for said terminal, a response message comprising an item of correction information of said estimated error,
- the terminal comprises means configured to generate a frequency, by the frequency synthesis means of said terminal, as a function of the item of correction information received from the access network.

In particular embodiments, the terrestrial wireless communication system can further comprise one or several of the following characteristics, taken individually or according to all technically possible combinations.

In particular embodiments, the item of correction information received from the access network is used by the terminal to generate a frequency of reception by the terminal of a broadcast signal transmitted by the access network.

In particular embodiments, the item of correction information received from the access network is used by the terminal to generate a transmission frequency by the terminal of a message intended for the access network.

BRIEF DESCRIPTION OF THE DRAWINGS

The invention shall be better understood when reading the following description, given by way of example that is in no way limiting, and given in reference to the figures which show:

FIG. 1: a diagrammatical representation of an embodiment of a terrestrial wireless communication system, FIG. 2: frequency spectra showing examples of problems that can be introduced by an error in the generation of the frequency by frequency synthesis means of a terminal.

In these figures, references that are identical from one figure to another designate identical or similar elements. For reasons of clarity, the elements shown are not to scale, unless mentioned otherwise.

DETAILED DESCRIPTION OF EMBODIMENTS

Figure 3:
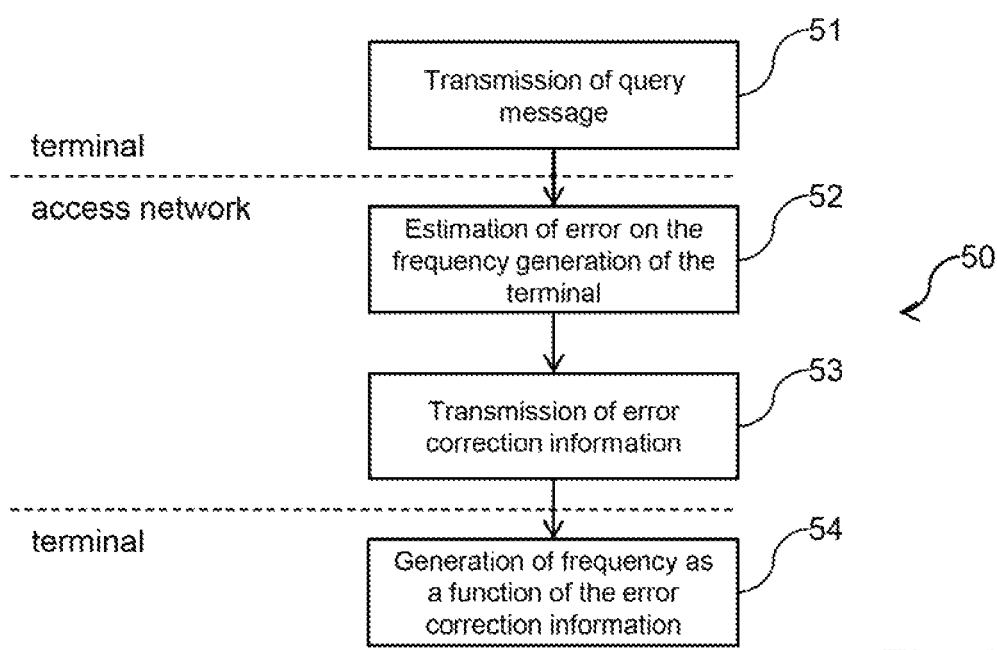
FIG. 3: a diagram showing the main steps of a method for correcting errors in the generation of a frequency by frequency synthesis means of a terminal.

FIG. 1 diagrammatically shows a terrestrial wireless communication system 10, comprising several terminals 20 and a terrestrial access network 30 comprising several base stations 31.

The terminals 20 and the base stations 31 of the access network 30 exchange data in the form of radio electric signals. The term "radio electric signal" means an electromagnetic wave propagating via wireless means, of which the frequencies are within the traditional spectrum of radio electric waves (a few hertz to several hundred gigahertz).

In the rest of the description, we shall consider in a non-limited manner the case where the terrestrial wireless communication system 10 is of ultra narrow band. The term "ultra narrow band" (UNB) means that the instantaneous frequency spectrum of the radio electric signals exchanged between the terminals 20 and the access network 30 is of frequency width less than two kilohertz, or even less than one kilohertz.

The terminals 20 are suitable for transmitting messages comprising data on an uplink intended for the access network 30, and each base station 31 is suitable for receiving the messages from terminals 20 that are within range of it. The data of each message received as such is for example transmitted to a server 32 of the access network 30, possibly along with other information such as an identifier of the base station 31 that received said message, the measured power level of said message, the date of reception of said message, etc.

Furthermore, the access network 30 is also able to transmit, by the intermediary of the base stations 31, messages comprising data on a downlink intended for terminals 20, which are able to receive them. The messages transmitted over the downlink are for example transmitted at the initiative of the access network 30, or in response to messages received on the uplink. For example, the access network 30 can respond to each message received, or respond only to certain messages received (for example respond only after having received a predefined number of messages from the same terminal 20, or responding only to messages comprising a query for this purpose, etc.).

According to the case considered, a message transmitted by the access network 30 over the downlink can be a global distribution signal (broadcast signal) or a group distribution signal (multicast signal), or be part of the framework of a point-to-point communication between the access network 30 and a particular terminal 20.

The messages of a terminal 20 are transmitted on the uplink on frequencies within a predetermined frequency band, shared by all of said terminals 20, referred to as "multiplexing band". Likewise, over the downlink, the messages transmitted by the access network 30 are transmitted over frequencies within a predetermined multiplexing band, shared by all of the terminals 20, which can be different from the multiplexing band considered on the uplink.

In order to transmit and receive messages, each terminal 20 comprises frequency synthesis means, which generate the frequency over which a message must be transmitted or received. Such frequency synthesis means are considered as being known by those skilled in the art, and comprise for example a local voltage-controlled oscillator, a mixer, etc.

In practice, a terminal 20 seeks to generate a frequency, referred to as "theoretical frequency", which corresponds to the desired frequency at the output of the frequency synthesis means. However, this theoretical frequency is generated only within the limit of precision of the frequency synthesis means, in such a way that the actual frequency obtained at the output of the frequency synthesis means is generally different from the theoretical frequency. In other terms, if F0 designates the theoretical frequency to be generated by the frequency synthesis means, then the actual frequency F1 obtained at the output of the frequency synthesis means is given by the following expression:

$$F1 = F0 + \varepsilon$$

expression wherein $\varepsilon$ corresponds to the error introduced during the generation of the theoretical frequency F0 by the frequency synthesis means.

Such as indicated hereinabove, in the case of a UNB terrestrial wireless communication system 10, in particular if the frequency synthesis means of the terminal 20 are of low performance, the error $\varepsilon$ can be higher than the frequency width $\delta F$ of the frequency spectrum of the radio electric signals transmitted or received by said terminal 20, even much higher than the latter (at least a factor of five).

FIG. 2 diagrammatically shows, in the frequency domain, different problems linked to the error $\varepsilon$ introduced by the frequency synthesis means. More particularly, the portion a) of FIG. 2 diagrammatically shows the frequency spectrum of a message transmitted by a terminal 20 on the uplink, while the portion b) of FIG. 2 diagrammatically shows the frequency spectrum of a message transmitted by the access network 30 over the downlink, for example a broadcast signal.

The portion a) of FIG. 2 shows the multiplexing band $\Delta F$ used on the uplink. In the example shown, the terminal 20 seeks to generate a theoretical frequency F0 which is close to a limit of the multiplexing band $\Delta F$. Due to the error $\varepsilon$ introduced, the actual frequency F1 generated by the frequency synthesis means is, such as shown by the portion a) of FIG. 2, outside of said multiplexing band $\Delta F$. Such as indicated hereinabove, in order to prevent any risk of generating a frequency outside of the multiplexing band $\Delta F$, the theoretical frequencies that are too close to the limits of the multiplexing band $\Delta F$ are avoided, which results in a sub-optimum use of said multiplexing band $\Delta F$.

The portion b) of FIG. 2 shows a broadcast signal transmitted by the access network 30 over a predetermined frequency F0, known a priori by terminal 20. In order to receive this message, the terminal 20 seeks to generate a theoretical frequency F0 but, due to the error $\varepsilon$ introduced, generates an actual frequency F1 that is different from the theoretical frequency F0. This results in that the terminal 20, thinking that it is listening to the downlink on the theoretical frequency F0, is actually listening to the actual frequency F1 and cannot receive the broadcast signal transmitted by the access network 30.

FIG. 3 shows the main steps of a method 50 for correcting the error $\varepsilon$ in the generation of the frequency by the frequency synthesis means of the terminal 20. Such as shown in FIG. 3, the method 50 for correcting the error $\varepsilon$ comprises steps of:

- transmitting 51, by the terminal 20 and intended for the access network 30, of a query message on a frequency generated by the frequency synthesis means,
- estimating 52, by the access network 30, of the error $\varepsilon$ in the generation of a frequency of the query message as a function of a theoretical transmission frequency of the query message by the terminal 20 and an actual frequency of reception of said query message by the access network 30,
- transmitting 53, by the access network 30 and intended for said terminal 20, of a response message comprising an item of correction information of said estimated error,
- generating 54 a frequency, by the frequency synthesis means of the terminal 20, as a function of the item of correction information received from the access network 30.

As such, such as shown in FIG. 3, the various steps of the method 50 for correcting the error ε are distributed between the terminal 20 and the access network 30 of the UNB wireless communication system 10.

More particularly, the terminal 20 executes the step 51 of transmitting the query message and the step 54 of generating a frequency.

To this effect, the terminal 20 comprises for example a processing module (not shown in the figures), comprising one or several processors and means for memorising (magnetic hard drive, electronic memory, optical disc, etc.) wherein is memorised a computer program product, in the form of a set of instructions of program code to be executed in order to implement said steps of transmitting 51 and of generating 54 frequency. In a variant, the processing module comprises one or several programmable logic circuits (FPGA, PLD, etc.), and/or one or several application specific integrated circuits (ASIC), and/or a set of discrete electronic components, etc., suitable for implementing all or a portion of said steps. The terminal 20 further comprises wireless means of communication, considered as known by those skilled in the art, allowing said terminal to transmit and to receive messages in the form of radio electric signals.

In other terms, the terminal 20 comprises a set of software configured means (specific computer program product) and/or hardware (FPGA, PLD, ASIC, discrete electronic components, etc.) in order to implement the steps 51 of transmitting the query message and 52 of generating the frequency of the method 50 for correcting the error ε.

The step 52 of estimating the error ε and the step 53 of transmitting the item of correction information intended for the terminal 20 are executed by the access network 30, here by at least one base station 31 of the access network 30, and optionally by the server 32.

In the rest of the description, we shall consider in a non-limited manner the case where the steps 52 of estimating the error ε and 53 of transmitting the item of correction information are executed by the base stations 31 of the access network 30. To this effect, each base station 31 comprises for example a processing module (not shown in the figures), comprising for example one or several processors and means for memorising (magnetic hard drive, electronic memory, optical disc, etc.) wherein is memorised a computer program product, in the form of a set of instructions of program code to be executed in order to implement the steps 52 of estimating the error ε and 53 of transmitting the item of correction information. In a variant, the processing module comprises one or several programmable logic circuits (FPGA, PLD, etc.), and/or one or several application specific integrated circuits (ASIC), and/or a set of discrete electronic components, etc., suitable for implementing all or a portion of said steps. Each base station 31 further comprises wireless means of communication, considered as known by those skilled in the art, allowing said base station to transmit and to receive messages in the form of radio electric signals.

In other terms, each base station 31 of the access network 30 comprises software configured means (specific computer program product) and/or hardware (FPGA, PLD, ASIC, discrete electronic components, etc.) in order to implement the steps 52 of estimating the error ε and 53 of transmitting the item of correction information.

A description of non-limiting examples of implementing the various steps of the method 50 for correcting the error ε shall now be provided.

A) Step 51 of Transmitting the Query Message

The step 51 of transmitting, by the terminal 20, of the query message aims to have a message affected by the error ε in the generation of the frequency by the frequency synthesis means of said terminal 20 reach the access network 30, in order to allow the access network 30 to estimate the error ε in the generating of the transmission frequency of said query message.

The query message can be a dedicated message, i.e. a message used solely to make it possible to estimate the error ε, or a message also used for other purposes. In particular, the query message can be a message comprising data which is transmitted to the server 32, said query message being also used by the base station 31 that has received said query message to estimate the error ε in the generating of the frequency of said query message.

To estimate the error ε in the generating of the frequency of the query message, the access network 30 has to be able to determine the theoretical frequency over which the terminal 20 tried to transmit the query message, i.e. the frequency over which the query message would have been transmitted by the terminal 20 in the absence of error ε.

For example, the theoretical frequency over which said query message has been theoretically transmitted by the terminal 20 is a predetermined frequency known a priori by the access network 30, i.e. known before the transmitting of the query message by the terminal 20. The theoretical frequency is then, more preferably, a predefined constant frequency, for example substantially in the middle of the multiplexing band, or a frequency negotiated beforehand between the access network and the terminals 20.

According to other examples, the access network 30 does not necessarily know the theoretical frequency over which the terminal 20 transmits the query message. In particular, in a UNB wireless communication system, the terminals 20 generally transmit their messages asynchronously. The term "transmit asynchronously" means that the terminals 20 autonomously determine when they transmit and/or over which frequency they transmit, without coordination of said terminals 20 between them and with the base stations 31 of the access network 30. In the case where the terminals 20 are at least asynchronous in frequencies, the messages are transmitted over frequencies that are a priori not known by the access network 30, and the frequency over which a query message is transmitted by a terminal 20 is therefore not known a priori by the access network 30. A base station 31 listens for example to the entire multiplexing band, and can detect within the latter a query message without knowing over which theoretical frequency said query message has been theoretically transmitted.

In the case where the access network 30 does not know a priori the theoretical frequency of transmitting the query message, said query message comprises more preferably an item of information allowing the access network 30 to determine the theoretical frequency over which said query message has been theoretically transmitted by the terminal 20. This item of information can be an explicit mention of the value of said theoretical frequency. Alternatively, this item of information can be an implicit mention of said value of said theoretical frequency. For example, if the terminal 20 selects the value of said theoretical frequency according to a predetermined method and according to certain items of information (sequence number of the query message, identifier of said terminal, etc.), then these items of information are preferably included in the query message in order to allow the access network 30 to determine the value of the theoretical frequency by applying the same method of selection as the terminal 20.

B) Step 52 of Estimating the Error ε

The step 52 of estimating the error ε is executed by the access network 30, here by at least one base station 31 of said access network 30 in the example considered.

During the step 52 of estimating the error ε, the access network 30 measures the actual frequency over which the query message has been received by said access network 30, which corresponds to an estimation of the actual frequency over which said query message has been transmitted by the terminal 20. The actual frequency measured is then compared to the theoretical frequency over which the query message has been theoretically transmitted by the terminal 20. The error ε is for example estimated according to the following expression:

$$\varepsilon' = F1' - F0$$

expression wherein:
ε' correspond to the estimation of the error ε,
F1' corresponds to the measurement of the actual frequency over which the query message has been received by the access network 30, which corresponds to an estimation of the actual frequency F1 of transmitting the query message by the terminal 20.

In the case where the theoretical frequency F0 is not known a priori by the access network 30, the step 52 of estimating the error ε comprises more preferably the extracting of the information, included in the query message, making it possible to determine the theoretical frequency F0 and the determination of said theoretical frequency F0 according to said information (sequence number of the query message, identifier of said terminal, etc.) by applying the same method of selection as the terminal 20.

Note that, in practice, the actual receiving frequency of the query message by the access network 30 can be different from the actual transmitting frequency of said query message by the terminal 20, for example in the case where the terminal 20 is mobile. Where applicable, the difference between the actual transmitting frequency by the terminal 20 and the actual receiving frequency by the access network 30, is it cannot be neglected, can be estimated according to any method known to those skilled in the art.

C) Step 53 of Transmitting the Item of Correction Information

The step 53 of transmitting the item of correction information is executed by the access network 30, here by at least one base station 31 of said access network 30 in the example considered.

During the step 53 of transmitting the item of correction information, the access network 30 determines, as a function of the estimated value ε', the item of correction information that allows the terminal 20 to correct the error ε during later generating of frequency.

For example, the item of correction information corresponds directly to the estimated value ε' of said error. In such a case, the terminal 20 can correct the frequency generation, by the frequency synthesis means, by generating a frequency (F0−ε') when said terminal 20 wants to generate a theoretical frequency F0.

According to another example, in the case where the correction aims primarily to allow the receiving, by the terminal 20, of a broadcast signal transmitted by the access network 30, the item of correction information correspond to a corrected value of a frequency of reception by the terminal 20 of said broadcast signal transmitted by the access network 30. For example, if the access network 30 transmits the broadcast signal over a frequency F2, then the item of correction information can correspond to the corrected value (F2−ε') which is such that the terminal 20, seeking to generate the theoretical frequency (F2−ε'), will generate an actual frequency that is substantially equal to the frequency F2. Such provisions are advantageous if the terminal 20 does not know a priori over which frequency the access network 30 transmits the broadcast signal. Indeed, the item of correction information then encompasses in a single more compact item of information both the value F2 of the transmitting frequency of the broadcast signal and the estimated value ε' of the error in generation. Nothing excludes however, according to other examples, to separately include in the response message both the estimated value ε' of the error in generation and the value F2 of the transmitting frequency of said broadcast signal by the access network 30.

In particular embodiments, the broadcast signal comprises for example N modulated signals transmitted over N different respective subcarriers having predefined frequency differences $\Delta Fn$ ($1 \leq n \leq N$) in relation to a predetermined frequency F3. For example, a first modulated signal is transmitted over a subcarrier (F3+$\Delta F_1$), a second modulated signal is transmitted over a subcarrier (F3+$\Delta F_2$), etc.

Each modulated signal transmitted over a subcarrier is for example intended for a particular group of terminals 20, and a terminal 20 does not know a priori the modulated signal that is intended for it and therefore does not know a priori the subcarrier that it has to listen to. In such a case, the item of correction information corresponds advantageously to the corrected value (F3+$\Delta$Fn−ε') of the subcarrier that the terminal 20 has to listen to (for example determined by the access network 30 as a function of an identifier of the terminal 20 included in the query message) or, if the frequency F3 is known a priori by said terminal 20, to the corrected value ($\Delta$Fn−ε') of the frequency difference of the subcarrier to be listened to in relation to the frequency F3. In other terms, if the modulated signal to be listened to is that transmitted over the subcarrier (F3+$\Delta$F2), then the item of correction information corresponds advantageously to (F3+$\Delta$F2−ε') or to ($\Delta$F2−ε'). As such, the item of correction information encompasses in a single more compact item of information both the absolute or relative value of the subcarrier to be listened to and the estimated value ε' of the error in generating.

Note that the error introduced during the frequency generation can vary with the theoretical frequency considered. Where applicable, in particular, the correction message can comprise several items of correction information, for example associated with different theoretical frequencies within the multiplexing band. These various items of correction information can be determined from the same query message, by considering a predetermined model for the variation of the error according to the theoretical frequency, making it possible to extrapolate the value of the error introduced for any one of the theoretical frequencies within the multiplexing band (of the uplink and/or of the downlink) using the value ε' estimated for a single theoretical frequency F0 of the multiplexing band of the uplink. Alternatively or as a complement, it is possible to determine these various items of correction information from several query messages transmitted by the same terminal 20 over different respective theoretical frequencies.

In the rest of the description, we shall consider in a non-limited manner the case where the error ε introduced during the generating of the frequency is substantially constant in the entire multiplexing band (of the uplink and/or downlink), in such a way that the query message can comprise only a single item of correction information.

D) Step 54 of Generating Frequency

During the step 54, the terminal 20 generates a frequency, by the frequency synthesis means, taking account of the item of correction information received from the access network 30.

For example, if the item of correction information corresponds to the estimated value ε' of the error introduced by the frequency synthesis means, then the terminal 20 generates, such as indicated hereinabove, a frequency (F0−ε') when said terminal 20 wishes to generate a theoretical frequency F0.

If the item of correction information corresponds to a corrected value of a receiving (or transmitting) frequency by the terminal 20, then the terminal 20 generates a theoretical frequency equal to the corrected value indicated by the item of correction information received from the access network 30.

The item of correction information received is for example used to generate a frequency of reception by the terminal 20 of a broadcast signal transmitted by the access network 30 and/or to generate a transmission frequency by the terminal 20 of a message intended for the access network 30. The item of correction information received can be used to generate the transmitting and/or receiving frequency of one or of several messages, and is for example used during a predetermined duration of validity of said item of correction information, at the end of which the terminal 20 can resume the steps of the method 50 of correcting the error ε by again transmitting a new query message intended for the access network 30.

More generally, note that the embodiments considered hereinabove have been described by way of examples that are not limiting, and that other alternatives can consequently be considered.

In particular, the invention has been described by considering a UNB terrestrial wireless communication system and low-performance frequency synthesis means, in such a way that the error that can be introduced can be greater than the frequency width of the instantaneous frequency spectrum of the messages transmitted or received by the terminal 20, or even much higher than the latter. Nothing excludes, according to other examples, considering a terrestrial wireless communication system that is not of ultra narrow band and/or frequency synthesis means that are not low-performance. In particular, the invention can also be applied when the error that can be introduced is less than the frequency width of the instantaneous frequency spectrum of the messages exchanged between the access network 30 and the terminals 20.

The description hereinabove clearly shows that through its characteristics and the advantages thereof, this invention achieves the objectives that were set for it. In particular, according to the invention, the error ε introduced by the frequency synthesis means of a terminal 20 is estimated by the access network 30, which limits the impact on the complexity of said terminal 20. This error is then corrected by the terminal 20 according to an item of correction information received from the access network 30, which makes it possible in particular to improve the detection of broadcast signals transmitted by the access network 30 and/or to improve the use of the multiplexing band of the uplink. In particular, a method for receiving a broadcast signal by a terminal 20 firstly comprises the transmitting by said terminal 20 of a query message intended for the access network 30, in order to receive a response message. The response message comprises an item of correction information to be used to receive said broadcast signal and optionally an item of information relative to a transmission frequency of said broadcast signal by the access network 30, if the latter is not known a priori by said terminal 20, which facilitates the detection of the broadcast signal by the terminal 20.

The invention claimed is:

1. A method for correcting an error in generation of a downlink frequency by a frequency synthesizer of a terminal of a terrestrial wireless communication system, the wireless communication system comprising an access network configured to exchange data with the terminal, comprising steps of:
    transmitting of a query message on an uplink frequency generated by the frequency synthesizer to the access network by the terminal;
    estimating, by the access network, of the error in the generation of the uplink frequency of the query message as a function of a theoretical transmission frequency of the query message by the terminal and an actual frequency of reception of the query message by the access network;
    transmitting a response message comprising an item of correction information of the estimated error to the terminal by the access network; and
    generating, by the frequency synthesizer of the terminal and as a function of the item of correction information received from the access network, a downlink frequency for reception by the terminal of a broadcast signal transmitted by the access network.

2. The method according to claim 1, wherein, as the theoretical transmission frequency of the query message is not known a priori by the access network, the query message comprises an item of information and the access network is configured to determine the theoretical frequency over which the query message has been theoretically transmitted by the terminal from the item of information of the query message.

3. The method according to claim 1, wherein the theoretical frequency over which the query message has been theoretically transmitted by the terminal is a predetermined frequency known a priori by the access network.

4. The method according to claim 1, wherein the terminal is configured to generate a transmission frequency for a message destined for the access network from the item of correction information received from the access network.

5. The method according to claim 1, wherein the item of correction information contains the estimated error.

6. The method according to claim 1, wherein the item of correction information contains a corrected value of the frequency of reception by the terminal of the broadcast signal transmitted by the access network.

7. A terrestrial wireless communication system comprising an access network and at least one terminal, said at least one terminal comprising a frequency synthesizer, wherein:
    said at least one terminal comprises a transmitter configured to transmit a query message on an uplink frequency generated by the frequency synthesizer to the access network;
    the access network comprises a processor to estimate an error introduced by the frequency synthesizer in generating the uplink frequency of the query message as a function of a theoretical transmission frequency of the query message by said at least one terminal and an actual frequency of reception of the query message by the access network;

the access network comprises a transmitter configured to transmit a response message comprising an item of correction information of said estimated error to said at least one terminal; and said at least one terminal is configured to receive a broadcast signal transmitted by the access network on a downlink frequency generated by the frequency synthesizer as a function of the item of correction information received from the access network.

8. The terrestrial wireless communication system according to claim 7, wherein said at least one terminal is configured to transmit a message to the access network on a transmission frequency generated by the frequency synthesizer as a function of the item of correction information received from the access network.

* * * * *